United States Patent [19]

McNinch, Jr.

[11] Patent Number: 4,722,237

[45] Date of Patent: Feb. 2, 1988

[54] FLUID ACTUATED SHIFT BAR HOUSING ASSEMBLY HAVING A CENTERING CYLINDER THEREIN

[75] Inventor: Joseph H. McNinch, Jr., Livonia, Mich.

[73] Assignee: Eaton Corporation, Cleveland, Ohio

[21] Appl. No.: 941,249

[22] Filed: Dec. 12, 1986

[51] Int. Cl.[4] .............................................. F16H 3/22
[52] U.S. Cl. ........................................ 74/346; 74/335; 74/364; 74/365; 74/475; 74/DIG. 2
[58] Field of Search ................. 74/331, 335, 346, 359, 74/365, 372, 375, 475, 477, DIG. 2, 364

[56] References Cited

U.S. PATENT DOCUMENTS

| | | | |
|---|---|---|---|
| 2,924,111 | 2/1960 | Backus et al. | 74/365 X |
| 2,943,502 | 7/1960 | Perkins et al. | 74/365 X |
| 2,943,719 | 7/1960 | McNamara et al. | 74/339 X |
| 3,508,450 | 4/1970 | Richards | 74/340 |
| 3,667,309 | 6/1972 | Franz et al. | 74/340 |
| 3,863,518 | 2/1975 | Webber et al. | 74/346 X |
| 4,361,060 | 11/1982 | Smyth | 74/866 |
| 4,388,843 | 6/1983 | Teeter | 74/477 X |
| 4,440,037 | 4/1984 | Foxton et al. | 74/331 |
| 4,445,393 | 5/1984 | Braun | 74/346 |
| 4,531,422 | 7/1985 | Yarnell | 74/475 |

Primary Examiner—Leslie Braun
Assistant Examiner—Dwight G. Diehl
Attorney, Agent, or Firm—D. A. Rowe; H. D. Gordon

[57] ABSTRACT

A pressurized fluid actuated shift bar housing assembly (12) for a change gear transmission (10) is provided having a plurality of shift bars (54, 56, 58), each shift bar having associated therewith a first (108) and a second (110) selectively pressurized and exhausted chamber utilized to axially position the shift bar in a first and second axially displaced position. A third relatively small volume selectively pressurized chamber (140) is utilized to positively axially position each of the shift bars in the nondisplaced axially centered positions thereof.

9 Claims, 7 Drawing Figures

FLUID ACTUATED SHIFT BAR HOUSING ASSEMBLY HAVING A CENTERING CYLINDER THEREIN

BACKGROUND OF THE INVENTION

1. Field of the Invention

The present invention relates to fluid actuated shift bar housing assemblies for change gear transmission, and, in particular, relates to fluid actuated shift bar housing assemblies wherein selectively applied fluid pressure is effective to urge all of the shift bars into a neutral axial position, or to urge a selected one of the shift bars into at least one selectable axially displaced position for engaging a selected transmission gear ratio. More particularly, the present invention relates to a fluid actuated shift bar housing assembly, preferably actuated by a compressible fluid such as compressed air or the like, having a plurality of shift bars each having an axially centered position, a first axially displaced position wherein the shift bars are axially displaced from the centered position in a first axial direction and a second axially displaced position wherein the shift bars are axially displaced from the centered position in a second axial direction. The housing assembly associated with each shift bar has an actuating portion comprising three selectably pressurized chambers for urging said shift bars into any one of the three selectable axial positions thereof. A relatively small volume chamber is utilized to urge the shift bars positively into the axial centered positions thereof whereby a single valve may be utilized to pressurize the centering chambers for all of the shift bars of the shift bar housing assembly.

2. Description of the Prior Art

Shift bar housing assemblies wherein a plurality of axially moveable shift bars, also known as shift rails and shift rods, each carrying or associated with a shift fork, are selectively axially moved to engage or disengage a selected transmission gear by axial movement of a clutch member, or of a gear carrying clutch teeth, are well known in the prior art, as may be seen by reference to U.S. Pat. Nos. 3,105,395; 3,611,823; 4,152,949; 4,194,410 and 4,445,393, all assigned to the assignee of this invention and all hereby incorporated by reference.

Fluid actuated shift bar housing assemblies, usually actuated by pressurized hydraulic fluid or pressurized air, and the controls therefor, are also well known in the prior art, as may be seen by reference to U.S. Pat. Nos. 2,924,111; 2,931,237; 2,932,371; 2,943,502; 2,943,719; 2,974,766 and 4,445,393, all assigned to the assignee of this invention and all hereby incorporated by reference.

While the prior art fluidly actuated shift bar housing assemblies are generally satisfactory and are presently widely utilized, usually for remotely controlled and/or automatically controlled change gear transmissions, the prior art assemblies were not totally satisfactory as they were complicated and/or expensive to produce, install and/or service, and/or utilize springs or other means to center the shift rails in a neutral position which means tended to shift the transmission into neutral in the event of a loss of pressurized fluid which might undesirably render the driven device totally unusable and/or the volume of pressurized fluid required to actuate the neutral or centering cylinders of the various shift rods was relatively large requiring a relatively long time to exhaust and/or requiring a plurality of valves to be utilized to urge all of the shift bars to the axially centered position, thereby rendering the shift bar housing assembly undesirably unresponsive, complicated and/or expensive.

SUMMARY OF THE INVENTION

In accordance with the present invention, the drawbacks of the prior art are minimized or overcome to the extent that a relatively simple and reliable pressurized fluid actuated shift bar housing assembly is provided which utilizes a relatively low volume cylinder and piston assembly to positively axially center the various shift bars in the neutral positions thereof thus allowing all of the centering cylinder/piston assemblies of the shift bar housing assembly to be fluidly interconnected and controlled by a single valving element, preferably a solenoid control valve. The above provides for relatively responsive shifting of the shift bars, positive axial centering of all of the shift bars in the neutral positions thereof, and for a relatively simple and inexpensive fluidly actuated shift bar housing assembly as compared to the prior art devices.

Accordingly, it is an object of the present invention to provide a new and improved fluid pressure actuated shift bar housing assembly.

This and other objects and advantages of the present invention will become apparent from a reading of the description of the preferred embodiment taken in connection with the attached drawings.

DESCRIPTION OF THE PREFERRED EMBODIMENT

Figure 1:
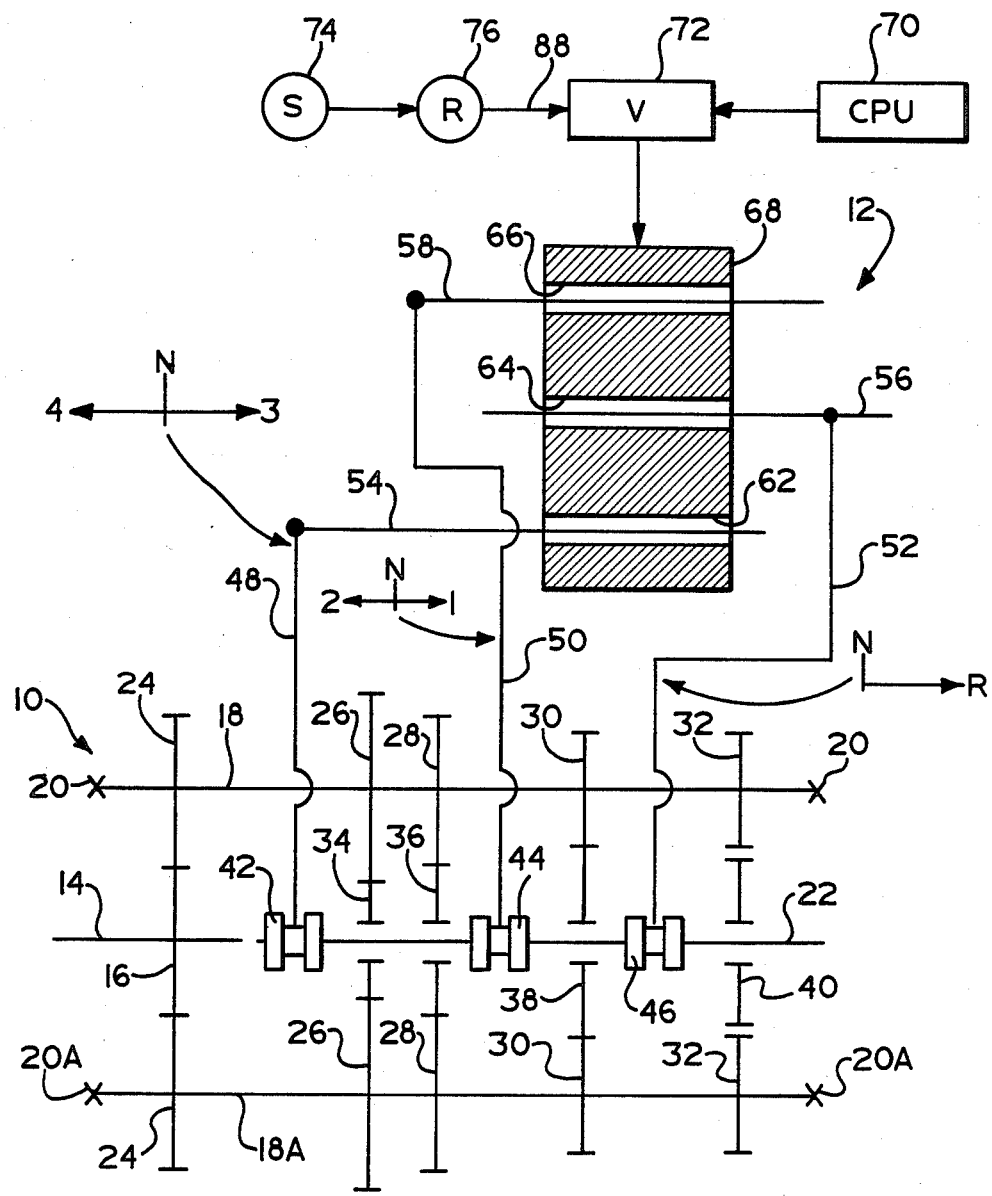
FIG. 1 is a schematic illustration of a change gear transmission, or transmission section, utilizing the fluid pressure operated shift bar housing assembly of the present invention.
Figure 2:
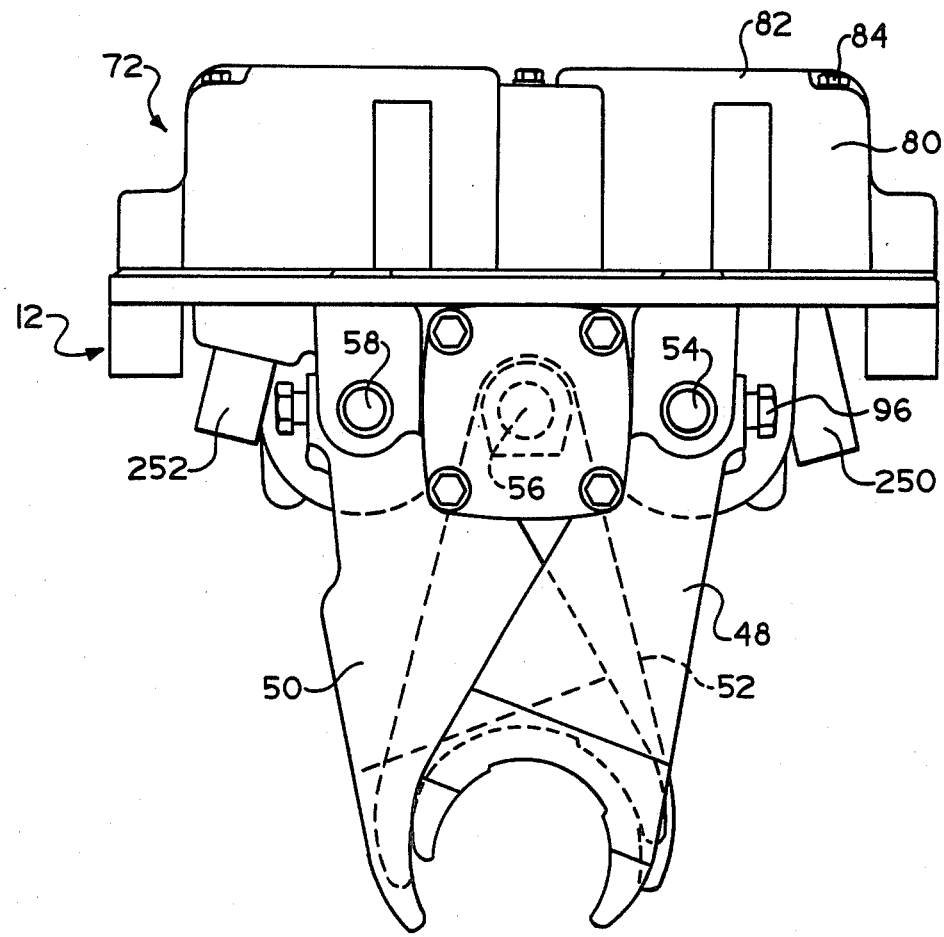
FIG. 2 is a front view of the shift bar housing assembly of the present invention.

In this disclosure, certain terminology will be used for convenience and reference only and will not be limiting. For example, the terms "forward" and "rearward" will refer to directions forward and rearward of the transmission or transmission shift bar housing assembly as normally mounted in a vehicle. The terms "rightward" and "leftward" will refer to directions in the drawings in connection with which the terminology is used. The terms "inwardly" and "outwardly" will refer to directions toward and away from, respectively, the geometric center of the apparatus being described. The terms "upward" and "downward" will refer to directions as taken in the drawings in connection with which the terminology is used. All foregoing terms include the normal derivatives and equivalents thereof.

A typical change gear transmission or transmission section 10 with which the fluid actuated shift bar housing assembly 12 of the present invention may be advantageously utilized may be seen by reference to FIG. 1. Transmission 10 is a simple transmission, or transmission section, of the twin countershaft type which is well known in the art, and which may be understood in greater detail by reference to above-mentioned U.S. Pat. Nos. 3,105,395 and 4,152,949.

The illustrated transmission 10 comprises an input shaft 14 carrying an input gear 16 for rotation therewith. Input shaft 14 is intended to be driven by a prime mover (not shown) through a master clutch or torque converter (not shown) as is well known in the art. A pair of substantially identical countershafts 18 and 18A are rotatably mounted in a housing (not shown) by means of bearings 20 and 20A. A main or output shaft 22 is provided which is preferably floatingly and/or pivotally mounted in the transmission housing.

Each of the countershafts 20 and 20A carries countershaft gears 24, 26, 28, 30 and 32 fixed thereto for rotation therewith. Countershaft gear 24 is constantly meshed with the input gear 16. Third speed mainshaft gear 34 surrounds main shaft 22 and is constantly meshed with and supported by the countershaft gears 26. Second speed mainshaft gear 36 surrounds main shaft 22 and is constantly meshed with and supported by countershaft gears 28. First speed mainshaft gear 38 surrounds main shaft 22 and is constantly meshed with and supported by countershaft gears 30. The reverse mainshaft gear 40 surrounds mainshaft 22, and is constantly meshed with and supported by a pair of idler gears (not shown) which, in turn, are constantly meshed with and driven by countershaft gears 32. Preferably, as is well known in the art, mainshaft gears 34, 36, 38 and 40 are radially moveable relative to mainshaft 22. The advantages of utilizing a floating mainshaft 22 and/or floating mainshaft gears are well known in the art and may be appreciated in greater detail by reference to the aforementioned U.S. Pat. No. 3,105,395.

Axially slidable clutches 42, 44 and 46 are mounted, preferably by a splined connection, to mainshaft 22 for axial sliding movement relative thereto, and for rotation therewith. Clutch 42 may be moved to the left from the neutral position shown to selectively couple the mainshaft 22 directly with input gear 16 and input shaft 14 for fourth or direct drive of transmission 10, or moved rightwardly from the position shown to engage mainshaft gear 34 with mainshaft 22 for third speed operation of transmission 10. Clutch 44 may be moved from the position shown leftwardly to engage mainshaft gear 36 with mainshaft 22 for second speed operation or may be moved rightwardly from the position shown to engage mainshaft gear 38 with mainshaft 22 for first speed operation of transmission 10. Clutch 46 may be moved rightwardly from the position shown to engage mainshaft gear 40 with mainshaft 22 for reverse operation of transmission 10. Of course, clutches 42, 44 and 46 may be positive clutches, friction clutches, blocked clutches and/or synchronized clutches.

A shift fork or yoke 48 is received in a groove in clutch 42 for controlling the axial position of clutch 42 relative to mainshaft 22. A shift fork 50 is received in a groove in clutch 44 for axially controlling the position of clutch 44 relative to mainshaft 22. A shift fork 52 is received in an axial groove in clutch 46 for controlling the axial position of clutch 46 relative to mainshaft 22.

Shift bar housing assembly 12 includes three axially movable shift bars, also called shift rails or shift rods, 54, 56 and 58, which are substantially parallel and independently axially slidable in substantially parallel bores 62, 64 and 66, respectively, in shift bar housing 68. Shift bar housing 68 is mountable to the transmission housing (not shown) in a conventional manner. Shift fork 48 is axially movable with shift bar 54, shift fork 50 is axially movable shift bar 58 and shift fork 52 is axially movable with shift bar 56. Of course, various levers and/or other mechanical/fluid connections may be interposed between the shift bars and the shift fork as is well known in the art.

A control device, such as central processing unit 70, will provide a signal indicative of desired engaged gear ratio to a valve assembly 72, which will typically comprise a plurality of individually controllable valves, such as solenoid valves, or the like. Valve assembly 72 is fluidly connected to a source of pressurized fluid, preferably a compressible fluid such as compressed air, from a source 74 which is preferably regulated by a regulator valve 76. Pressurized fluid valve assembly 72 may be of any one of a plurality of designs, and will provide pressurized fluid to the shift bar housing assembly 12 to selectively axially position the shift bars as will be described in greater detail below. The command signals from controller 70 to valve assembly 72 may be fluid, electrical, mechanical or a combination thereof, as is well known in the art. Preferably, central processing unit 70 is microprocessor based as illustrated in U.S. Pat. No. 4,595,986, the disclosure of which is hereby incorporated by reference, and transmission 10 is utilized in an automatic mechanical transmission system of the type illustrated in U.S. Pat. No. 4,361,060, the disclosure of which is hereby incorporated by reference.

Transmission 10 is illustrated as utilizing positive, non-synchronized jaw clutches, as is well known in the art. Of course, frictional clutches, synchronized positive clutches and/or blocked clutches as are more fully described in U.S. Pat. Nos. 4,194,410; 3,924,484 and 3,799,002, the disclosures of which are hereby incorporated by reference, may be utilized. As only one of the clutches should be engaged at any one time to avoid damage to the transmission, shift bar housing assembly 12 will include an interlock mechanism to prevent movement of more than one of the shift bars 54, 56 and 58 from the neutral axial positions thereof at a given time.

The transmission 10 illustrated is of the four forward speed one reverse speed type and thus shift bar 56 and shift fork 52 axially fixed thereto are utilized only for engagement and disengagement of reverse speed. It is understood, however, that the shift bar housing assembly 12 of the present invention is also advantageously utilizable with a transmission having five forward speeds and a reverse speed, in which case shift fork 52 would be utilized to engage a first or low reduction forward ratio as well as reverse.

The details of construction of shift bar housing assembly 12 may be seen by reference to FIGS. 2, 3, 4, 5 and 6. As may be seen, shift bar housing assembly 12 includes a housing 68 having a mounting flange 78 for mounting to the transmission housing. The shift bar housing also includes a valve housing portion 80 and a removable valve housing cover 82, retained by bolts 84, in which the valving assembly 72 is received. The valve housing 80 and shift bar housing 68 also define various fluid passageways as will be described in greater detail below. Valve assembly housing 80 includes a fluid inlet connection 86 for connection to a conduit 88 fluidly connected to the source 74 of pressurized fluid.

The valve assembly housing 80 will also include connections to a source of electrical energy (not shown) and connections for receiving input commands from CPU unit 70 to operate the solenoid valves.

Figure 4A:
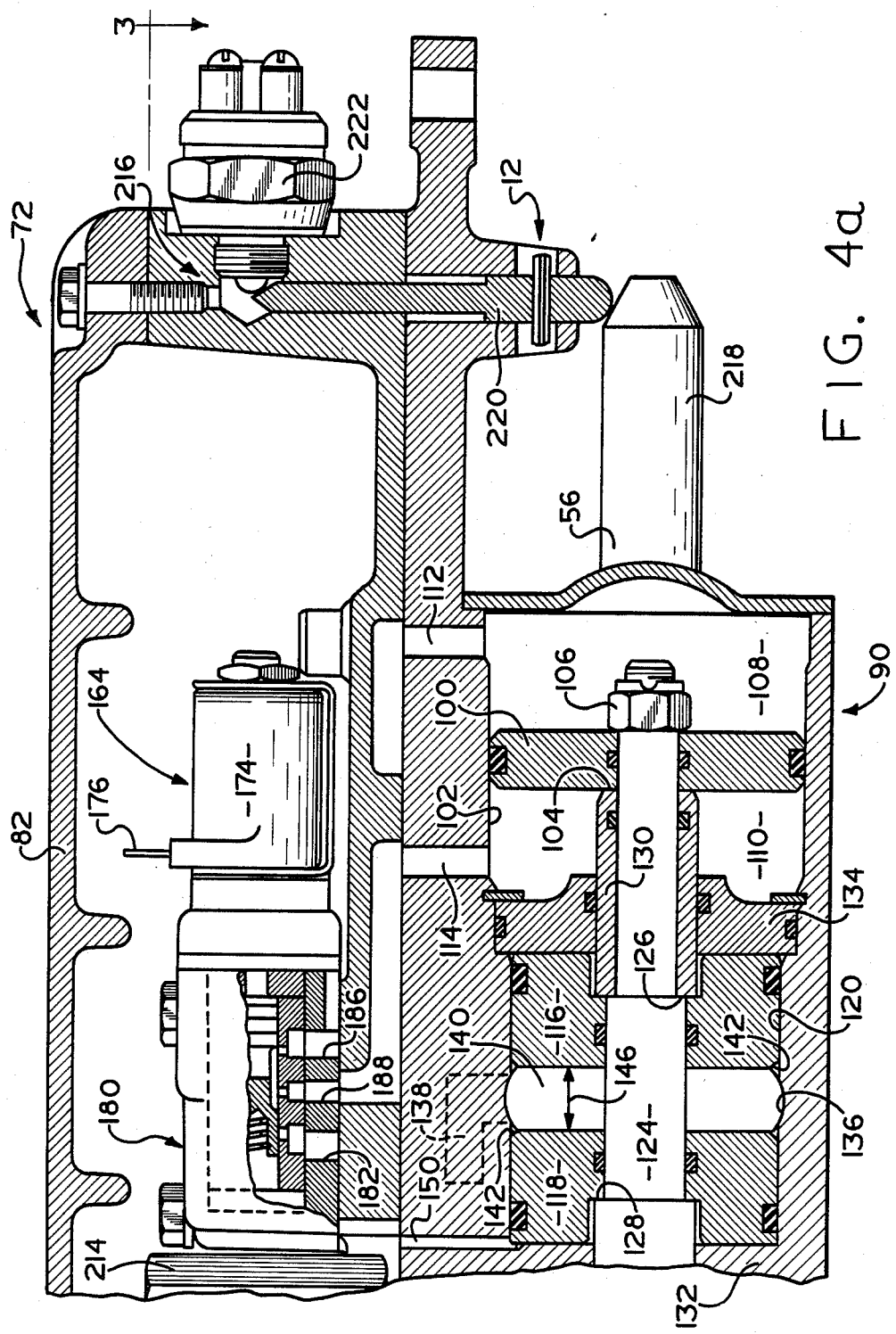
FIGS. 4A and 4B are a side view, in section, of the shift bar housing assembly of the present invention taken along the line 4—4 in FIG. 3.
Figure 4B:
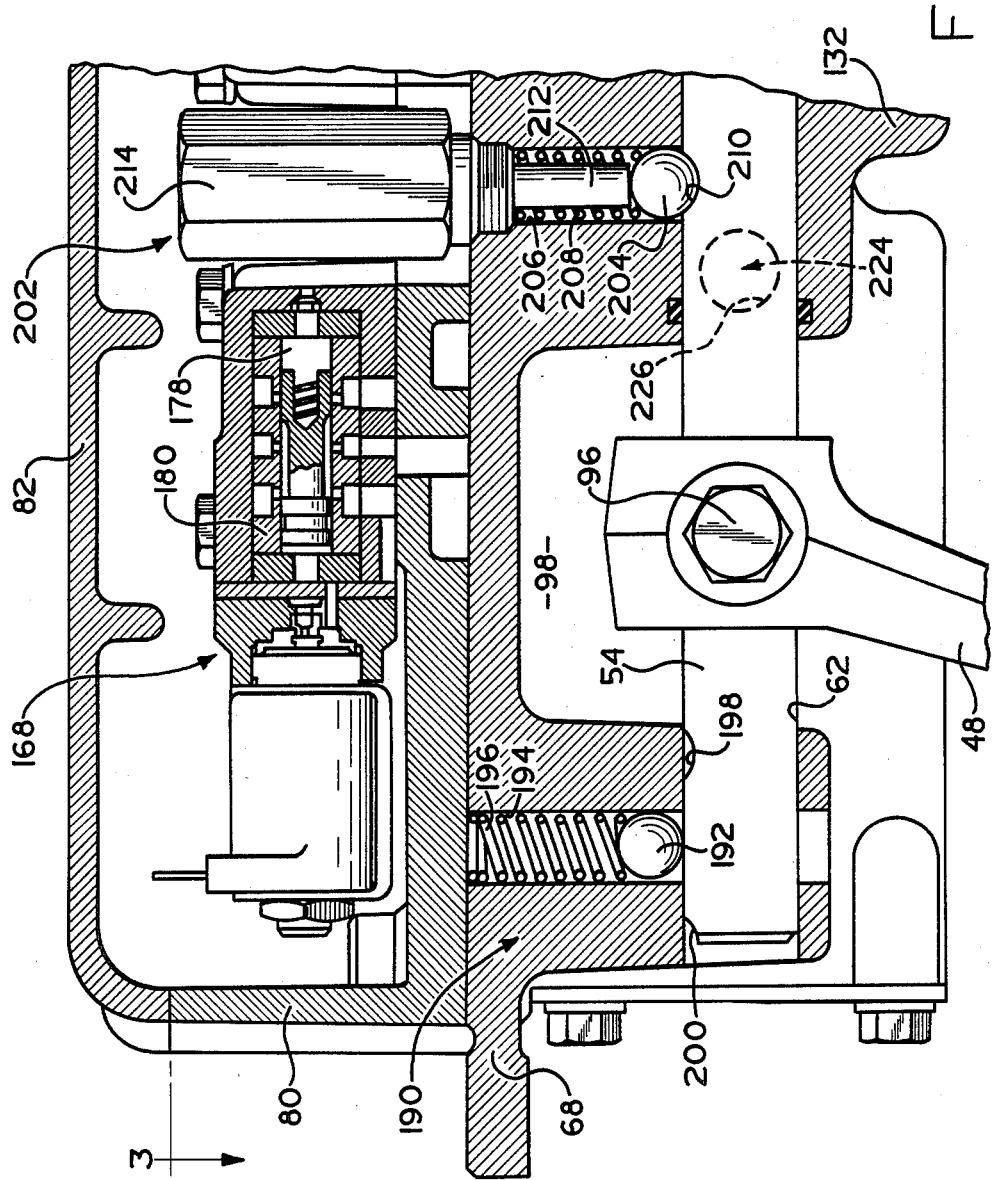
Figure 5:
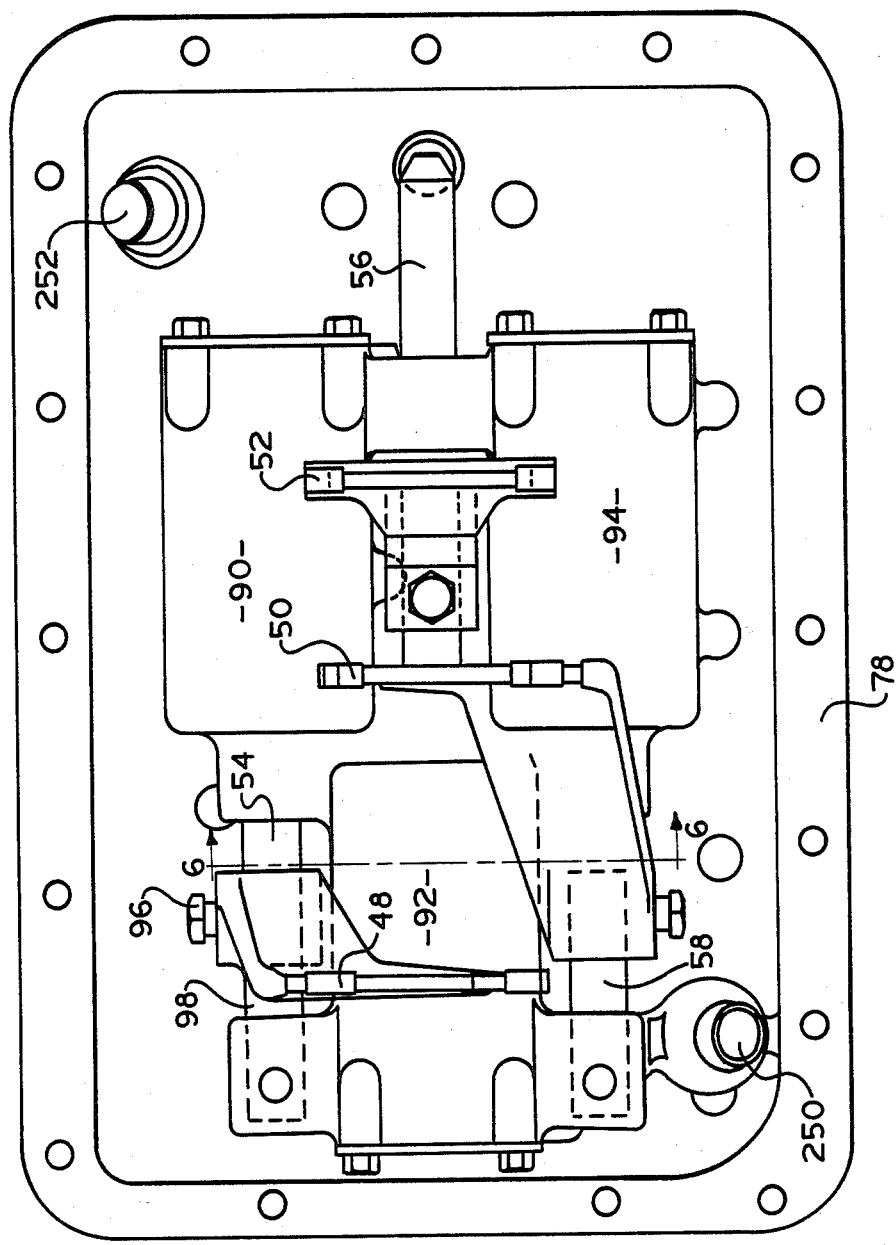
FIG. 5 is a bottom view of the shift bar housing assembly of the present invention.

The details of construction of the shift bars 54, 56 and 58, respectively, and their associated piston/cylinder assemblies, 90, 92 and 94, respectively, may be seen by reference to FIGS. 4 and 5. As may be seen by reference to FIG. 5, the shift bar housing portions enclosing actuator piston/cylinder assemblies 90, 92 and 94 are of a relatively larger diameter then the housing portions supporting the shift bars 54, 56 and 58 axially positioned thereby. Accordingly, in the shift bar housing assembly of the present invention, shift bar 56, and its associated piston/cylinder assembly 92, is oriented in the opposite direction and is interposed shift bar 58 and its associated actuator assembly 94, and shift bar 54 and its associated actuator assembly 90, providing a nested-type construction allowing the shift housing assembly to be of a more compact width and height and/or to utilize larger piston/cylinder surface areas.

Referring to FIGS. 4A and 4B, the details of construction of shift bar 54 and its associated piston/cylinder actuator assembly 90 are shown in detail. It is understood that the structure and function of shift bar 56 and its actuator assembly 92, and shift bar 58 and its associated actuator assembly 94, are functionally and structurally substantially identical.

Shift bar or rail 54 is slidingly received in bore 62 provided in shift bar housing 68, and carries shift fork or shift yoke 48 axially fixed thereto as by set screw structure 96. A pocket 98 is formed in shift bar housing 68 to allow for the required axial movement of shift bar 54 and shift fork 48 from the illustrated centered position to the axially displaced positions thereof. Similar pockets are formed in the shift bar housing 68 to allow movement of the other shift rails and shift forks. An actuator piston 100 is axially fixed to shift bar 54 and is axially slidably and sealingly received in actuator cylinder 102 defined by housing 68. In the illustrated embodiment, piston 100 is axially fixed to shift bar 54 by means of a shoulder 104 and nut 106 which axially trap piston 100 therebetween. Shift actuator piston 100 divides cylinder 102 into a righthand 108 and lefthand 110 chamber. Fluid passages 112 and 114 are formed in the housings 68 and 80 to fluidly connect chambers 108 and 110, respectively, with their respective actuator valves, as will be described in detail below.

Briefly, pressurization of chamber 108 and venting of chamber 110 will result in shift rail 54 and shift fork 48 moving axially leftwardly for engagement of fourth speed while pressurization of chamber 110 and exhausting of chamber 108 will result in a rightward axial movement of shift bar 54 and shift fork 48 for third speed operation of transmission 10.

A pair of neutral centering pistons 116 and 118 are sealingly and slidably received in cylinder 120 and are sealingly and slidably received on necked-down portion 124 of shift bar 54 defined between shoulders 126 and 128. It is noted that a spacer member 130 may be utilized to define shoulder 104 and 126 on shift bar 54. The axial ends of cylinder 120 are defined by end walls 132 and 134. A groove 136 is provided in the cylindrical innerdiameter surface of cylinder 120 and communicates with a fluid passage 138 formed in housings 68 and 80 for fluidly connecting the space 140 between the centering pistons 116 and 118, with the neutral operating valve, as will be described in detail below. It is noted that annular groove 136 and the tapered surfaces on the opposed faces of the centering pistons 116 and 118 assure that pressurized fluid introduced to passage 138 will fluidly communicate with the space 140 between the centering pistons for all axial positions of the centering pistons. A pair of small exhaust passages 150 communicate with cylinder 120 to allow exhausting of trapped pressurized fluid.

The rightward and leftward, respectively, axial movement of centering pistons 116 and 118, respectively, relative to cylinder 120 is limited by the end walls 134 and 132, respectively. Similarly, the rightward and leftwardly, respectively, axial movement of centering pistons 116 and 118, respectively, relative to shift bar 54 is limited by the shift bar shoulders 126 and 128, respectively. The leftward and rightward, respectively, axial movement of the centering piston 116 and 118, respectively, relative to the shift cylinder 120 is limited by engagement of the other centering piston. Accordingly, axial movement of the shift bar 54 and shift fork 48 from the illustrated centered position is limited to the maximum axial separation 146 between the neutral centering piston 116 and 118. Similarly, introduction of fluid pressure via passage 138 to the chamber 140 defined between the centering pistons 116 and 118, while chambers 108 and 110 are exhausted, will result in shift bar 54 and shift fork 48 positively positioned in the neutral axial centered position thereof.

Disengagement of the various clutches, during a break in the transmission of driving torque, requires a relatively smaller axial force. Accordingly, the required surface area of centering pistons 116 and 118, and thus the volume of pressurized fluid required in chamber 140 is minimized. As only three neutral centering chambers are required for the positive neutral positioning of all three shift rails 54, 56 and 58 (i.e. the positive positioning of transmission 10 in the neutral position) results in a relatively small total volume of pressurized fluid is required which may be supplied by a single control valve which will greatly simplify the structure of the shift bar housing assembly and associated valving 72, while decreasing the cost and improving the reliability thereof.

Figure 3:
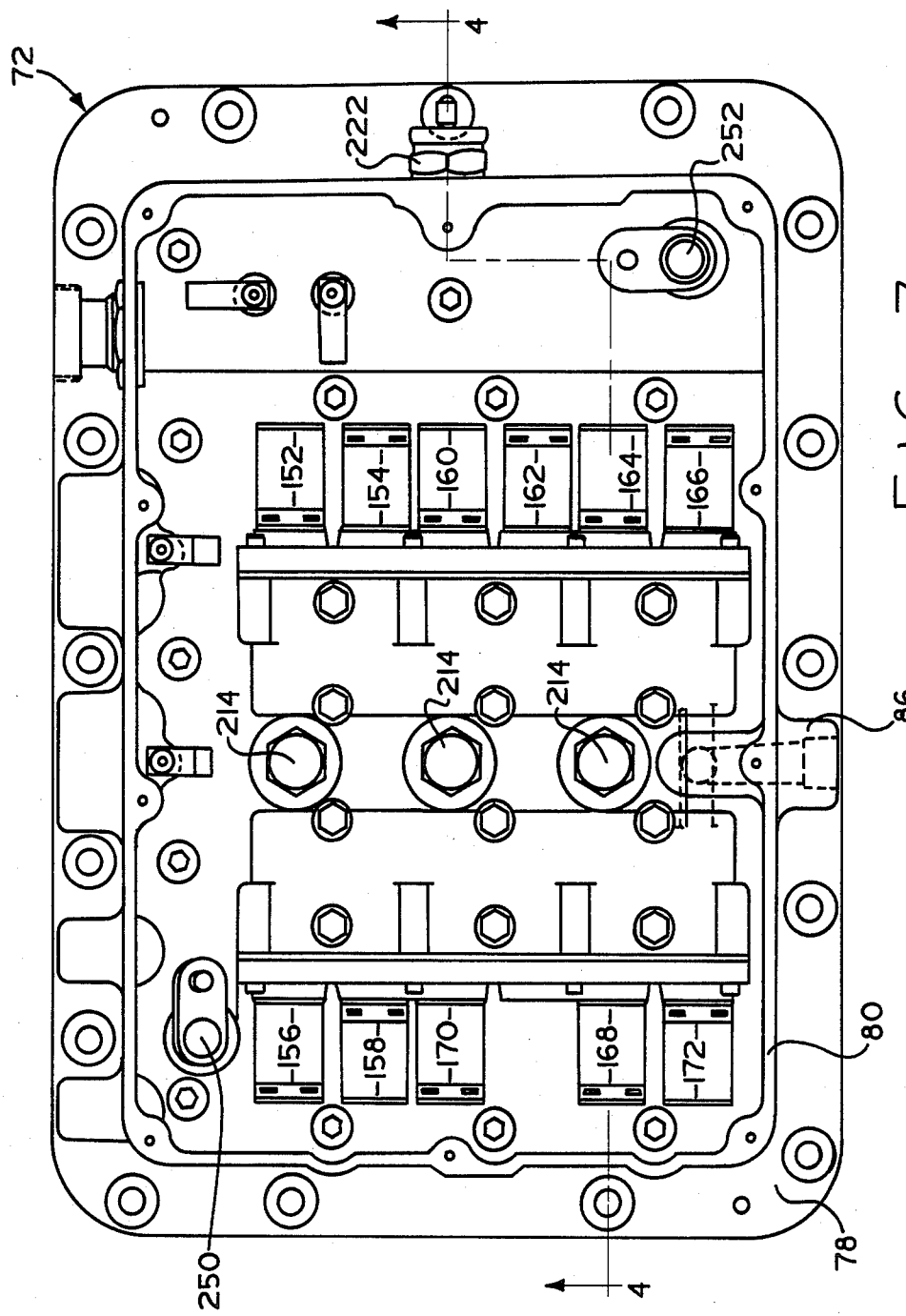
FIG. 3 is a top view taken along line 3—3 in FIGS. 4A and 4B of the shift bar housing assembly of the present invention.

Referring to FIGS. 3, 4A and 4B, it may be seen that the valving assembly 72 includes eleven three way-two position solenoid controlled spool valves. Briefly, solenoid controlled spool valves 152, 154, 156 and 158 are utilized to control the shifting of a auxiliary transmission section (not shown) and form no part of the present invention. Solenoid controlled spool valves 160, 162, 164, 166 and 168 are utilized to selectively engage first, second, third, fourth and reverse, respectively, speed operations of transmission 10. Solenoid controlled spool valve 170 is used to control an input brake in the present embodiment. The space between valves 168 and 170 is not used in this embodiment, but would be used if leftward axial movement of shift fork 52 were required as would be the case in a five forward speed transmission. Solenoid controlled spool valve 172 utilized to positively select the neutral condition for transmission 10 by positively axially centering all of the main transmission section shift bars.

Each of the solenoid controlled spool valves is essentially identical and includes a solenoid actuator 174 having a connection to a source of electrical power 176, which controls a two-position valving member 178 in a three-way valve body 180. The valve body 180 includes a first port 182 connected to the pressurized fluid connection 86, a second port 186 connected to an exhaust and third port 188 fluidly connected to the cylinder chamber associated therewith. The spool members are normally biased to a first position wherein the third port 188 is fluidly connected with the exhaust port 186 while the supply port is blocked and may be actuated to shift to a second position wherein the third port 188 is fluidly connected to the pressurized fluid port 182 while the exhaust port 186 is fluidly blocked. Three-way two-position solenoid actuated spool valves are well known in the prior art, are commercially available in many configurations and the specific structure thereof forms no part of the present invention.

A feature of the present invention is that shift bar housing assembly 12 will retain transmission 10 in an engaged gear in the event of a loss of fluid pressure such as failure of the source 74 or failure of fluid conduit 88, or the like. This is an important feature, as may be seen by considering the utilization of transmission 10 in a heavy duty vehicle. It is important to assure that the transmission of a vehicle is not suddenly and unintentionally shifted from an engaged gear into neutral. It may also be important that the transmission remain in the engaged gear in the event of a loss of system pressure thereby providing the possibility that the vehicle will retain its engine breaking capability and the possibility that the vehicle may proceed under power to a safe location (i.e. a "limp home" capability). Each of the shift rails 54, 56 and 58 is provided with an engaged position detent mechanism, only one of which 190 is illustrated. Detent mechanism 190 comprises a plunger or ball member 192 slidably received in a bore 194 which extends transverse to and intersects bore 162. Detent ball member 192 is resiliently biased by a spring 196 radially inwardly toward the axis of bore 62 and will align with and engage grooves 198 and 200, respectively, in shift bar 54, when shift bar 54 is in the fourth speed or third speed, respectively, positions thereof, to retain shift bar 54 in said axially displaced positions.

Each of the shift bars 54, 56 and 58 is also provided with a neutral detent and sensing assembly, only one of which 202 is illustrated. Neutral detent and sensing assembly 202 comprises a detent ball or plunger member 204 received in bore 206 which intersects bore 62. A biasing spring 208 biases detent ball 204 radially inwardly to engage neutral detent groove 210 provided in shift bar 54 when shift bar 54 is in the axially centered neutral condition. The assembly 202 also includes a sensor or switch mechanism, including a plunger 212 and switch mechanism 214 for providing a signal indicative of shift bar 54 being in the neutral position thereof. Each of the shift bars is provided with a similar neutral sensing switch 214, all of which must provide a signal indicative of the neutral position of the shift rail associated therewith to indicate to the central processing unit 70 that the transmission 10 is in the neutral position. An additional sensor assembly 216 is provided for sensing engagement of the reverse gear for actuation of the vehicle backup lights and/or other reverse mode of operation warning devices. Reverse sensing assembly 216 comprises an extension 218 of shift rail 56, which engages a plunger member 220 to actuate switch 222 when shift rail 56 is moved axially rightwardly from the centered neutral position illustrated.

Figure 6:
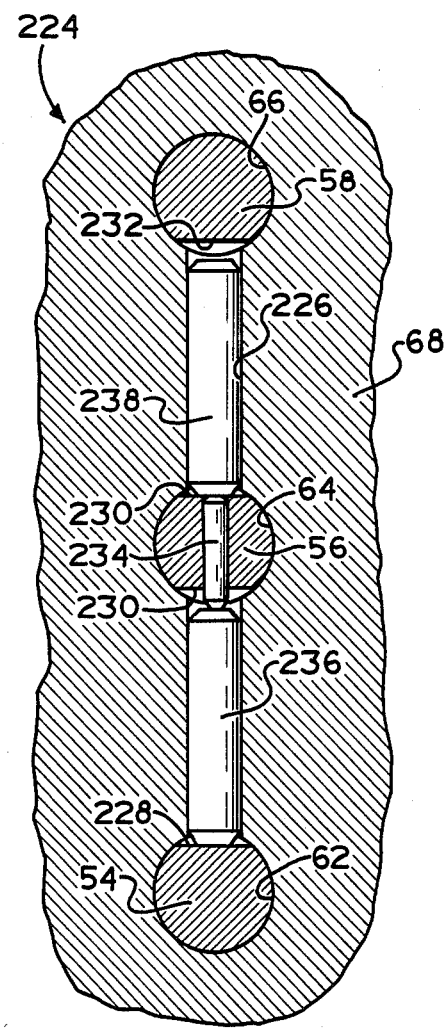
FIG. 6 is a partial sectional view taken along the lines 6—6 in FIG. 5 illustrating the interlock mechanism utilized in a shift bar housing assembly of the present invention.

Preferably, as shown in FIG. 6, shift bar housing assembly 12 is also provided with an interlock mechanism 224 for preventing movement of any two of the shift bars 54, 56 and 58 when any other one of the shift bars is moved from the neutral position. Briefly, shift bar housing 68 is provided with a transverse bore 226, transverse to and intersecting bores 62, 64 and 66, in which the shift rails 54, 56 and 58, respectively, are received. Groove 228, 230 and 232, respectively, are provided in shift bar 54, 56 and 58, respectively, which grooves will align with bore 226 when the shift rails are in the neutral positions. A piston member 234 is slidably received in shift bar 56. Pin members 236 and 238, respectively, are slidably received in bore 226 between shift rails 54 and 56 and shift rails 56 and 58, respectively, and are each of an axial length generally equal to the distance between the bores and the radial depth of the grooves. Piston member 234 has a axial length generally equal to the diameter of bore 64. Accordingly, movement of any of the shift bars from the neutral position thereof will result in axial movement of members 236 and 238 into firm contact with the annular groove portions of the other shift bar members thereby locking the other shift bar members in the neutral positions, as is well known in the prior art. The structure and operation of interlock mechanisms of this type is well known in the prior art and further details thereof will not be provided herein.

Accordingly, as may be seen, only six solenoid controlled valves are actually utilized for shifting of the four forward speed one reverse speed transmission 10 of the present invention. By providing fluid passages and mounting space for a seventh solenoid, the shift bar housing assembly 12 may also be utilized with a five forward speed one reverse speed transmission or transmission section. Additionally, speed sensor assemblies 250 and 252 for sensing the rotational speed of the input and output shafts 16 and 22, respectively, of transmission 10 may be built into the shift bar housing assembly for purposes of automating transmission 10 without requiring extensive modification to the transmission structure 10 itself.

Although this invention has been described in its preferred form with a certain degree of particularity, it is understood that the present disclosure of the preferred embodiment has been made only by way of example, and that numerous changes in the detailed construction in combination and arrangement of the parts may be resorted to without departing from the spirit and the scope of the invention, as hereinafter claimed.

I claim

1. A pressurized fluid operated shift bar housing assembly for a change gear transmission, said assembly comprising:

a shift bar housing having a plurality of generally parallel axially extending shift bar bores therein;

a shift bar slidably received in each of said shift bar, bores, each of said shift bars having an axially centered position, a first axially displaced position wherein said shift bar is axially displaced from said centered position in a first axial direction and a second axially displaced position wherein said shift bar is axially displaced from said centered position in a second axial direction;

a shift fork associated with each of said shift bars and axially moved thereby, said shift forks effective to cause engagement of a first transmission gear ratio in the first axially displaced position of said shift bar and effective to cause engagement of a second transmission gear ratio in the second axially displaced position of said shift bar, said shift forks effective to disengage said first and second transmission gear ratios in the axially centered position of said shift bars;

each of said shift bores having associated therewith a first cylinder defined in said housing, a first shifting piston axially fixed to each of said shift bars and slidably and sealingly received in said first cylinder to define a first and a second selectively pressurized fluid chambers, pressurization of said first selectively pressurized fluid chamber effective to cause said first shifting piston to axially move said shift bar from said centered position to said first axially displaced position and pressurization of said second selectively pressurized fluid chamber effective to cause said first shifting piston to axially move said shift bar from said centered position to said second axially displaced position;

valve means connectable to a source of pressurized fluid for selectively pressurizing and exhausting said first and second selectively pressurized fluid chambers;

said assembly characterized by:

each of said shift bores having associated therewith a centering cylinder defined by said housing;

a first and a second centering piston slidably and sealingly received in said centering cylinder, said first and second centering pistons axially separatable in said centering cylinder by a maximum distance generally equal to the axial movement of said shift bar between the axially centered position and said first axially displaced position and also generally equal to the axial movement of said shift bar between said axially centered position and said second axially displaced position, said first and second centering pistons having opposed faces defining a third selectively pressurized and exhausted fluid chamber therebetween, said first centering piston displaced in said first axial direction from said second centering piston, a first stop means limiting axial movement of said first centering piston relative to said shift bar in said first axial direction, a second stop means limiting axial movement of said second centering piston relative to said shift bar in said second axial direction, said first and second centering pistons, when engaging said first and second stop means, respectively, axially separatable by a distance generally equal to said maximum distance;

fluid passageways defined in said centering cylinder and said first and second centering pistons to provide constant fluid communication between a selectively pressurized and exhausted fluid passage and said third selectively pressurized chamber;

a neutral selection valve associated with said valve means for selectively pressurizing and exhausting said selectively pressurized and exhausted fluid passage and each of said selectively pressurized and exhausted third chambers in fluid communication with said selectively pressurized and exhausted fluid passage whereby all of said shift bars may be positively urged to the neutral axially central positions thereof by means of a single neutral selection valve.

2. The shift bar housing assembly of claim 1, wherein the section of said shift bar housing associated with each of said shift bars defines a first portion having a relatively small outer periphery and a second portion including said actuation and centering cylinders having a relatively larger outer periphery, said shift bars arranged such that adjacent housing sections have the first portions thereof extending in opposite axial directions.

3. The shift bar housing assembly of claim 2, wherein said housing defines bores for receipt of speed sensors therein.

4. The shift bar housing assembly of claim 2, wherein said shift forks are attached to said shift bars on said first portions thereof.

5. The shift bar housing assembly of claim 2 wherein each shift bar is provided with a first resiliently biased detent mechanism for resiliently retaining said shift bar in the first and second axially displaced positions thereof, and a separate second detent mechanism for resiliently retaining said shift bar in the axially centered position thereof.

6. The shift bar housing assembly of claim 5 wherein said second detent mechanism includes a switch means associated therewith for providing a signal indicative of the shift bar associated therewith being in said axially centered position.

7. The shift bar housing assembly of claim 5, wherein said shift forks are attached to said shift bars on said first portions thereof.

8. The shift bar housing assembly of claim 1 wherein said valve means comprise a plurality of separately controllable three way two-position solenoid control valves, each of said valves having a first position for connecting a port to the source of pressurized fluid and a second position for connecting said port to an exhaust.

9. The shift bar housing assembly of claim 1 wherein said centering pistons are slidably and sealingly supported on said shift bar.

* * * * *